US010567838B2

(12) United States Patent
Swaminathan et al.

(10) Patent No.: US 10,567,838 B2
(45) Date of Patent: Feb. 18, 2020

(54) DIGITAL CONTENT CONSUMPTION ANALYSIS

(71) Applicant: Adobe Inc., San Jose, CA (US)

(72) Inventors: Viswanathan Swaminathan, Saratoga, CA (US); Gang Wu, Ames, IA (US)

(73) Assignee: Adobe Inc., San Jose, CA (US)

( * ) Notice: Subject to any disclaimer, the term of this patent is extended or adjusted under 35 U.S.C. 154(b) by 634 days.

(21) Appl. No.: 14/503,802

(22) Filed: Oct. 1, 2014

(65) Prior Publication Data
US 2016/0099854 A1 Apr. 7, 2016

(51) Int. Cl.
*H04N 21/442* (2011.01)
*H04N 21/482* (2011.01)
*H04N 21/81* (2011.01)
*H04N 21/845* (2011.01)
*H04L 29/08* (2006.01)

(52) U.S. Cl.
CPC ....... *H04N 21/44222* (2013.01); *H04L 67/22* (2013.01); *H04N 21/44213* (2013.01); *H04N 21/4826* (2013.01); *H04N 21/812* (2013.01); *H04N 21/8456* (2013.01)

(58) Field of Classification Search
CPC ..... H04L 67/22; H04L 67/10; H04L 43/0876; H04N 21/44222; H04N 21/44213; H04N 21/4826; H04N 21/8456; H04N 21/812
USPC .......................................................... 709/224
See application file for complete search history.

(56) References Cited

U.S. PATENT DOCUMENTS

| 8,001,561 | B2 | 8/2011 | Gibbs et al. |
| 8,983,888 | B2* | 3/2015 | Nice ........................ G06N 5/02 706/45 |
| 2005/0278758 | A1 | 12/2005 | Bodlaender |
| 2008/0127280 | A1 | 5/2008 | Kuang et al. |
| 2009/0132520 | A1* | 5/2009 | Nemeth ................... G06F 16/48 |
| 2009/0228918 | A1* | 9/2009 | Rolff ........................ H04N 7/163 725/34 |
| 2010/0332440 | A1* | 12/2010 | Brodsky ............ G06Q 30/0244 706/52 |

(Continued)

OTHER PUBLICATIONS

Bell, et al., "Improved Neighborhood-based Collaborative Filtering," KDDCup '07, pp. 7-14 (Aug. 12, 2007).

(Continued)

*Primary Examiner* — Emmanuel L Moise
*Assistant Examiner* — Xiang Yu
(74) *Attorney, Agent, or Firm* — Finch & Maloney PLLC

(57) ABSTRACT

Content consumption session progress is predicted based on historical observations of how users have interacted with a repository of digital content. This is approached as a matrix completion problem. Information extracted from tracking logs maintained by one or more content providers is used to estimate the extent to which various content items are consumed. The extracted session progress data is used to populate a session progress matrix in which each matrix element represents a session progress for a particular user consuming a particular content item. This matrix, which in principle will be highly ($\geq 95\%$) sparse, can be completed using a collaborative filtering matrix completion technique. The values obtained as a result of completing the session progress matrix represent predictions with respect to how much of a given content item will be consumed by a given user.

18 Claims, 3 Drawing Sheets

(56) References Cited

U.S. PATENT DOCUMENTS

| | | | | |
|---|---|---|---|---|
| 2011/0282745 | A1* | 11/2011 | Meoded | G06Q 30/0264 705/14.61 |
| 2014/0074858 | A1* | 3/2014 | Kalmes | G06F 17/30035 707/748 |
| 2014/0122502 | A1* | 5/2014 | Kalmes | G06F 17/30029 707/748 |
| 2014/0149326 | A1* | 5/2014 | Kalmes | G06N 5/02 706/14 |
| 2015/0020126 | A1* | 1/2015 | Kegel | H04H 60/65 725/87 |

OTHER PUBLICATIONS

Bell, et al., "Lessons from the Netflix Prize Challenge", ACM SIGKDD Explorations Newsletter, vol. 9, No. 2, pp. 75-79 (2007).

Cai, et al., "A Singular Value Thresholding Algorithm for Matrix Completion", Society for Industrial and Applied Mathematics Journal on Optimization, vol. 20, No. 4, pp. 1956-1982 (Mar. 3, 2010).

Candès, et al., "Exact Matrix Completion via Convex Optimization", Foundations of Computational Mathematics, vol. 9, No. 6, pp. 717-772 (2009).

Candès, et al., "Matrix Completion With Noise", <http://arxiv.org/abs/0903.3131> (Mar. 18, 2009).

Candès, et al., "The Power of Convex Relaxation: Near-Optimal Matrix Completion", <http://arxiv.org/abs/0903.1476> (Mar. 9, 2009).

Chistov, et al., "Complexity of Quantifier Elimination in the Theory of Algebraically Closd Fields", Lecture Notes in Computer Science, vol. 176, pp. 17-31 (1984).

Feuerverger, et al., "Statistical Significance of the Netflix Challenge", <http://arxiv.org/abs/1207.5649> (Jul. 24, 2012).

Grant, et al., "Disciplined Convex Programming", chapter in "Global Optimization: From Theory to Implementation (Nonconvex Optimization and Its Applications)", Springer Science+Business Media, Inc., pp. 155-210 (2006).

Keshavan, et al., "Matrix Completion from a Few Entries", <http://arxiv.org/abs/0901.3150> (Sep. 17, 2009).

Kim, et al., "Scalable Variational Bayesian Matrix Factorization with Side Information", Proceedings of the 17th International Conference on Artificial Intelligence and Statistics, Reykjavik, Iceland, pp. 493-502 (Apr. 2014).

Mazumder, et al., "Spectral Regularization Algorithms for Learning Large Incomplete Matrices", Journal of Machine Learning Research, vol. 11, pp. 2287-2322 (Aug. 2010).

Recht, et al., "Guaranteed Minimum-Rank Solutions of Linear Matrix Equations via Nuclear Norm Minimization", Society for Industrial and Applied Mathematics Review, vol. 52, No. 3, pp. 471-501 (Aug. 5, 2010).

Salakhutdinov, et al., "Collaborative Filtering in a Non-Uniform World: Learning with the Weighted Trace Norm", <http://arxiv.org/abs/1002.2780v1> (Feb. 14, 2010).

Salakhutdinov, et al., "Restricted Boltzmann Machines for Collaborative Filtering", <http://machinelearning.wustl.edu/mlpapers/paper_files/icml2007_SalakhutdinovMH07.pdf> (2007).

Srebro, et al., "Generalization Error Bounds for Collaborative Prediction with Low-Rank Matrices", Advances in Neural Information Processing Systems (NIPS) 17 (Dec. 2004).

Srebro, et al., "Maximum-Margin Matrix Factorization", Advances in Neural Information Processing Systems (NIPS) 17 (Dec. 2004).

Srebro, et al., "Weighted Low-Rank Approximations", Proceedings of the Twentieth International Conference on Machine Learning (ICML-2003), Washington DC (2003).

* cited by examiner

|  | Content Item 1 | Content Item 2 | Content Item 3 | ... | Content Item $N$ |
|---|---|---|---|---|---|
| User 1 | 0.13 | ? | 0.00 | ? | ? |
| User 2 | ? | 0.85 | ? | 1.00 | ? |
| User 3 | ? | ? | ? | ? | 0.00 |
| ⋮ | 0.40 | 1.00 | ? | 0.17 | ? |
| User $M$ | ? | ? | 0.55 | ? | 0.78 |

DIGITAL CONTENT CONSUMPTION ANALYSIS

FIELD OF THE DISCLOSURE

This disclosure relates generally to digital content consumption, and more specifically to methods for predicting the duration of a digital content consumption session based on historical observations of how users have interacted with a repository of digital content.

BACKGROUND

A wide range of video content is available online. Consumers can readily obtain full-length motion pictures, broadcast television programs, cable or satellite television programs, home movies, music videos, and user-created content (UCC) from an ever-growing number of online repositories, databases, and other content providers. This continual increase in the amount of video content available online has resulted in a corresponding increase in popularity of websites providing video-on-demand streaming services such as YouTube, Hulu, Netflix, And iTunes. Content providers such as these have immense content repositories comprising thousands of video segments contributed by users ranging from amateur videographers to professional production companies. Because the quality of the available content varies greatly, rating systems have been developed to help consumers make informed content selections. One common rating system is a star-based rating system, wherein viewers can rate content items manually by selecting from one to five stars (or other rating units). These individual ratings are then combined, averaged, or otherwise aggregated to provide an overall content rating that, in theory, reflects the popularity of a particular content item. In principle, these content ratings not only inform consumer decisions, but they also enable sponsors and content providers to recommend popular content items and make predictions with respect to content that might interest a particular user. Because individual preferences often play a significant role in content ratings, content providers have often sought to personalize their rating systems as much as possible. Thus many content providers require user authentication before content ratings are accepted. Such rating systems have been implemented in conjunction with a wide range of digital content, including audio and video content.

DETAILED DESCRIPTION

Figure 1:
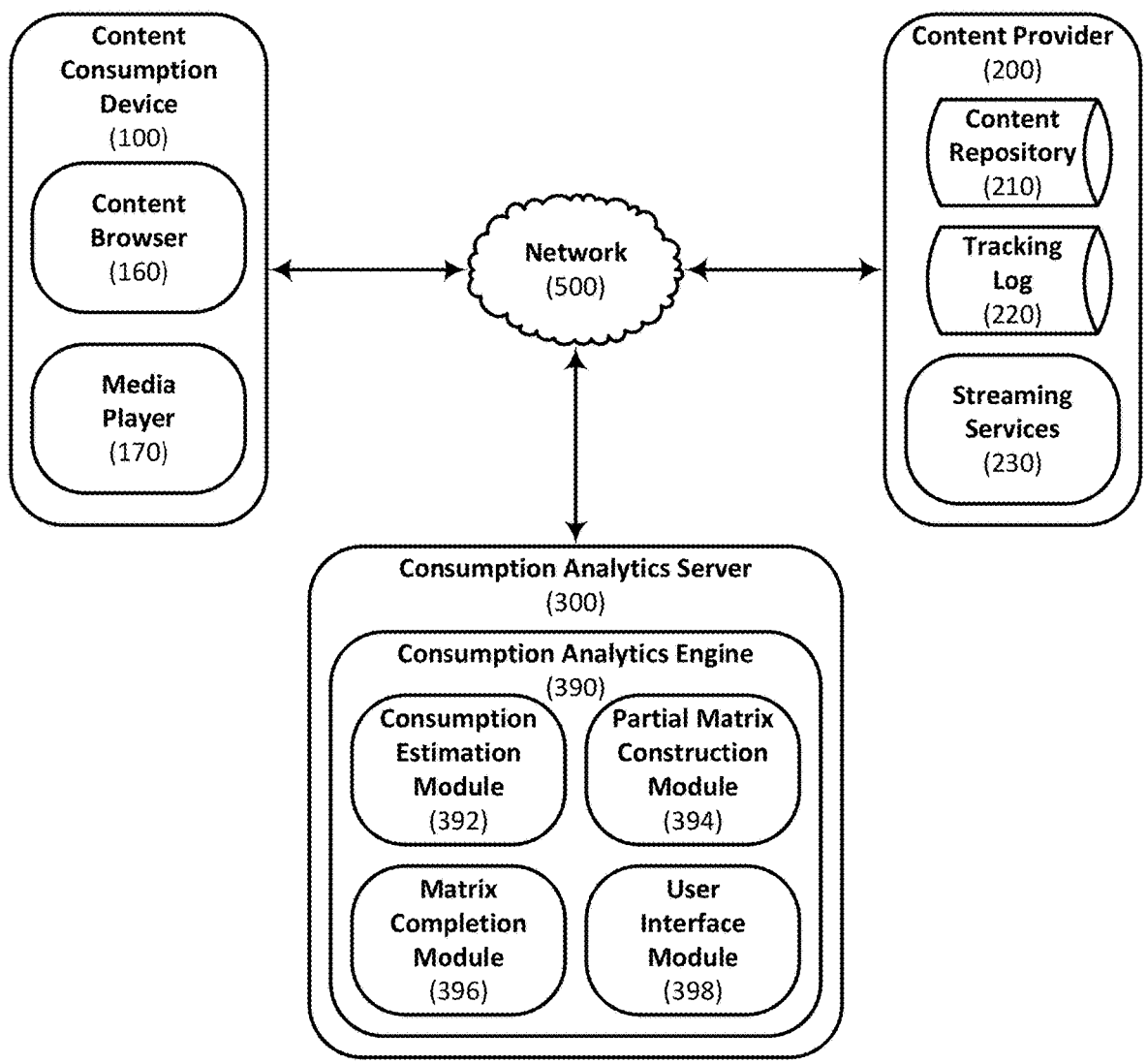
FIG. 1 is a block diagram illustrating selected components of a networked computer system that can be used to predict the duration of a digital content consumption session based on historical observations of how users have interacted with a repository of digital content.

Although existing content rating systems do provide some insight into the popularity of a particular content item, such systems nevertheless suffer from a number of shortcomings. For example, many existing rating systems require some degree of user interaction, such as by clicking a number of stars after watching a video segment. Such feedback can be understood as "explicit feedback" in that it is derived from affirmative user input. In addition, while some content rating systems accept anonymous ratings, many systems require user authentication before a content rating is accepted. In either case, the content consumer often perceives the rating process as a burdensome "extra step" that results in little or no personal benefit, thus increasing the likelihood that the consumer will forego the rating process altogether. As a consequence, only a small fraction of content consumers actually submit content ratings, which results in a disconnect between the content ratings and the true feelings of the actual content consumers. Even where authentication is not required, ratings are still subject to manipulation by users with dodgy motives, further exacerbating the aforementioned disconnect. These shortcomings represent a substantial impediment to both consumers who rely on content ratings to make content selections as well as content providers that rely on content ratings to make targeted content recommendations.

Thus, and in accordance with certain of the embodiments disclosed herein, techniques are disclosed that allow digital content to be ranked and analyzed based on "session progress", or the portion of a content item that is consumed. Session progress can be understood as "implicit feedback" in that it is inherently generated when content is consumed. That is, it does not require affirmative user input other than the commands used to begin and end content consumption, such as media play or stop commands for audio or video content. Compared to existing rating systems, session progress provides a more effective and accurate measure of popularity for several reasons. For example, because it can be collected without additional user input, it can be collected from a larger fraction of—or the entire population of—content consumers. Session progress measurements are also less prone to errors and are more difficult to manipulate as compared to existing ranking systems. Both of these factors reduce the disconnect that tends to exist between conventional content ratings and the true feelings of the actual content consumers. Moreover, session progress analysis provides insight into the popularity of specific parts of a content item, which is particularly valuable for content providers who wish to insert advertisements into content items. Being able to predict session progress also allows networking resources to be allocated more efficiently. Thus the ability to predict the duration of a digital content consumption session is useful not only for optimizing what content is delivered to a consumer, but also how such content is delivered. Ultimately, this enables content providers to more effectively engage users with available content. These and other advantages will be appreciated in view of this disclosure.

In one embodiment session progress is predicted based on historical observations of how users have interacted with a repository of digital content. This can be approached as a matrix completion problem. Information extracted from tracking logs maintained by one or more content providers is used to estimate the extent to which various content items are consumed. Extracting data from tracking logs maintained by several different content providers broadens the data foundation upon which subsequent predictions are made, in terms of observing a wide range of both users and content items. This allows more accurate predictions to be made as compared to predictions based on existing content rating systems. The extracted session progress data can be used to populate a session progress matrix in which each matrix element represents a session progress for a particular user consuming a particular content item. This matrix, which in principle will be highly (≥95%) sparse, can be completed using collaborative filtering techniques. The values obtained as a result of completing the session progress matrix represent predictions with respect to how much of a given content item will be consumed by a given user.

In certain embodiments, the accuracy of the session progress predictions disclosed herein depends on the number of observed entries in the session progress matrix at a given sparsity. This accuracy can therefore be improved by observing more content consumption activity for a fixed set of users and content items, or by including new users and/or content items at the same sparsity level. Accuracy can also be improved by performing certain refinement operations before completing the session progress matrix, thereby reducing matrix size. Experimental results indicate that certain of the embodiments disclosed herein are able to more accurately predict session progress as compared to baseline prediction methods that use mean consumption values for a given content item. Numerous configurations and variations of this example implementation will be apparent in light of this disclosure.

As used herein, the term "content" refers, in addition to its ordinary meaning, to information intended for direct or indirect consumption by a user. For example, the term content encompasses information directly consumed by a user such as when it is displayed on a display device or printed on a piece of paper. The term content also includes information that is not specifically intended for display, and therefore also encompasses items such as software, executable instructions, scripts, hyperlinks, addresses, pointers, metadata, and formatting information. The use of the term content is independent of (a) how the content is presented to the user for consumption and (b) the software application used to create or render the content. Content may be encoded using one or more compression algorithms intended to reduce the amount of bandwidth required for transmission of the content via a network. The term "digital content" refers to content which is encoded in binary digits (for example, zeroes and ones). Thus, in the context of applications involving digital computers, the terms "content" and "digital content" are often used interchangeably. The term "content item" refers to a collection of content that is organized into a distinct unit, such as a file, which can be subjected to various processing operations. Thus while digital music or video may be referred to as content generally, a song or television episode may be referred to as a content item. Digital content items may also be referred to as "digital assets".

As used herein, the term "content consumption session" refers, in addition to its ordinary meaning, to an occasion where content is consumed. For purposes of brevity, a content consumption session may also be referred to as a "consumption session", or more simply, a "session". In the context of content items which have a temporal aspect, such as the aforementioned song or television episode, a content consumption session can be understood as having a duration. The duration of a content consumption session can be expressed in terms of "session progress", which refers to the ratio of the portion of a content item which is consumed to a total duration of the content item. Thus, for example, if a user were to listen to a complete song, the session progress would be unity. On the other hand, if a user were to watch fifteen minutes of a sixty-minute television show, the session progress would be 0.25. It will be appreciated that session progress is not necessarily continuous, and as such, may be measured differently depending on how an interrupted consumption session is to be accounted for.

System Architecture

FIG. 1 is a block diagram illustrating selected components of a networked computer system 1000 that can be used to predict the duration of a digital content consumption session based on historical observations of how users have interacted with a repository of digital content. Such embodiments can be understood as involving a series of interactions between a content consumption device 100, a content provider 200, and a consumption analytics server 300. The architecture and functionality of the various components and subcomponents comprising networked computer system 1000 will be described in turn. However, because the particular functionality provided in a given implementation may be specifically tailored to the demands of a particular application, this disclosure is not intended to be limited to provision or exclusion of any particular resources, components, or functionality.

In one embodiment content consumption device 100 can be understood as comprising any of a variety of computing devices that are suitable for rendering digital content received from content provider 200. For example, depending on the demands and use context of a particular implementation, content consumption device 100 may comprise a device such as a handheld computer, a cellular telephone, a tablet computer, a smartphone, a laptop computer, a desktop computer, a digital media player, or a set-top box. A combination of different devices can be used in alternative embodiments. On the other hand, content provider 200 can be understood as comprising one or more enterprise class devices configured to host content and stream or otherwise deliver the hosted content to content consumption device 100. While only one content consumption device 100 and one content provider 200 are illustrated in FIG. 1, it will be appreciated that, in general, tens, hundreds, thousands, or more content providers 200 can deliver content to an even larger number of content consumption devices 100.

Consumption analytics server 300 can be configured to analyze interactions between a plurality of content providers 200 and a plurality of content consumption devices 100. As disclosed herein, such analysis can be used to predict the duration of a digital content consumption session between a particular content consumption device 100 and a particular content provider 200. In some applications the predicted digital content consumption session may be "theoretical" in the sense that it does not yet exist. This theoretical session can be represented by the query, "What is the predicted session progress for an imagined content consumption session in which content consumer A watches video segment B?" In other applications the predicted digital content consumption session may be "actual" in that it occurs in response to initiation of a new content consumption session. This actual session can be represented by the query, "It has been observed that content consumer C has begun listening to audio segment D; how long do we expect this consumption session to last?"

It will be appreciated that content consumption device 100 and content provider 200 can be configured to provide content delivery in a client-server computing environment. Consumption analytics server 300 operates to analyze client-server interactions in such an environment to implement the various embodiments disclosed herein. Content consumption device 100, content provider 200, and consumption analytics server 300 can be configured to communicate with each other via a network 500, which may be a local area network (such as a home-based or office network), a wide area network (such as the Internet), or a combination of such networks, whether public, private, or both. For example, network 500 can be used to access other networks, computing devices, and/or resources, such as a targeted content management system or a cloud-based storage repository. Access to resources on a given network or computing system may require credentials such as usernames, passwords, or another suitable security mechanism. In one embodiment networked computer system 1000 comprises a globally distributed network of tens, hundreds, thousands, or more content servers 200 capable of delivering content over a network of secure communication channels to an even larger number of content consumption devices 100. Such content distribution can be monitored and analyzed by one or more consumption analytics servers 300.

In accordance with the foregoing, in one embodiment content consumption device 100, content server 200, and consumption analytics server 300 each includes one or more software modules configured to implement the various functionalities disclosed herein, as well as hardware that enables such implementation. One example of enabling hardware is a processor which may encompass one or more coprocessors or controllers. For instance, a processor associated with content consumption device 100 can be configured to implement content rendering and playback services, while a processor associated with content provider 200 can be configured to provide content delivery and streaming services. A processor associated with consumption analytics server 300 can be configured to implement matrix construction and completion services. Other enabling hardware which may be included in one or more of content consumption device 100, content server 200, and consumption analytics server 300 includes a communications module and a bus and/or interconnect. Communications module can be any appropriate network chip or chipset which allows for wired or wireless connection to network 500 and other computing devices and/or resources. Communications module can also be configured to provide intra-device communications via the bus and/or interconnect.

Yet another example of enabling hardware is a memory resource. A memory resource can be implemented using any type of digital storage, such as one or more of a disk drive, a redundant array of independent disks (RAID), a universal serial bus (USB) drive, flash memory, random access memory (RAM), or any suitable combination of the foregoing, including a networked or distributed system of multiple storage devices. In the context of content consumption device 100, memory resources can be used to cache content received from content provider 200. In addition, in embodiments wherein content consumption device 100 is intended to be used by several different users, memory resources can also be used to store user profile information. As illustrated in FIG. 1, content provider 200 can invoke memory resources to store content in a content repository 210 and track content consumption in a tracking log 220. Consumption analytics server 300 can use memory resources to store a partial session progress matrix that is populated with information extracted from tracking log 220, as well as a completed session progress matrix that includes session progress predictions generated using the matrix completion techniques disclosed herein.

As described herein, in certain embodiments content consumption device 100, content server 200, and consumption analytics server 300 each includes one or more software modules configured to implement the various functionalities disclosed herein. One example of such a software module is an operating system. Depending on the specific implementation, any suitable operating system can be used, including Google Android (Google Inc., Mountain View, Calif.), Microsoft Windows (Microsoft Corp., Redmond, Wash.), or Apple OS X (Apple Inc., Cupertino Calif.). As will be appreciated in light of this disclosure, the content consumption analysis techniques provided herein can be implemented without regard to the particular operating system provided in conjunction with content consumption device 100, content server 200, and consumption analytics server 300, and therefore alternative embodiments may be implemented using any suitable existing or subsequently developed platform. Other types of software modules which may be invoked in certain embodiments include device drivers, load management applications, and user authentication services. Still other software modules that provide functionality specific to content consumption device 100, content server 200, and consumption analytics server 300 will be described in turn.

For instance, content consumption device 100 includes one or more software modules configured to retrieve and render digital content hosted by content provider 200. To provide a specific example, FIG. 1 illustrates an embodiment wherein content consumption device 100 includes a content browser 160 and a media player 170, each of which can be configured to retrieve and render digital content hosted by content provider 200. It will be appreciated that in alternative embodiments content consumption device 100 includes additional, fewer, or alternative software modules for this purpose. In general, the particular type of content rendering software provided at content consumption device 100 depends on the particular type of content intended to be consumed at device 100. For example, a lightweight device that is dedicated to consumption of a particular type of content, such as an MP3 player, may include a single media player capable of rendering a small subset of content types. In other cases, a more robust device intended for use with a wide range of media types, such as a laptop computer, may include several different types of software capable of rendering audio, video, and other content types. In some embodiments media player 170 comprises a browser plugin or extension that is configured to be invoked within content browser 160. In other embodiments media player 170 comprises a standalone module that operates independently of content browser 160, which may be omitted altogether.

Content that is to be rendered at content consumption device 100 can be identified by a network address that is provided to browser 160 and/or player 170 by a user, or that is selected from previously rendered content in the form of a hyperlink. Content consumption device 100 can be configured to render content stored according to a wide variety of file formats and protocols. In certain embodiments content browser 160 comprises a software application selected from a web browser, an electronic mail reader, or a newsreader. Other types of software applications can be used to retrieve and render content in other embodiments. Examples of commercially available content browsers include Google Chrome (Google Inc., Mountain View, Calif.), Internet Explorer (Microsoft Corp., Redmond, Wash.), Microsoft Outlook (Microsoft Corp., Redmond, Wash.), Mozilla Thunderbird (Mozilla Foundation, Mountain View, Calif.), Opera Mail (Opera Software, Oslo, Norway), iTunes (Apple Inc., Cupertino, Calif.), and Adobe Acrobat (Adobe Systems Incorporated, San Jose, Calif.). It will be appreciated that the embodiments disclosed herein are configured to work with a wide variety of existing and subsequently developed content browsers.

Still referring to FIG. 1, content provider 200 can be configured to host content and stream or otherwise deliver the hosted content to one or more content consumption devices 100. Thus in certain embodiments content provider 200 comprises an array of enterprise class devices configured to provide content-on-demand to a large number of geographically distributed content consumers. In other embodiments content provider 200 comprises a personal computer capable of providing digital content to devices connected to a home network. To support these services, content provider 200 includes a number of subcomponents, such as content repository 210, tracking log 220, and streaming services 230. Other subcomponents and services can be provided in other embodiments.

For example, in one embodiment content repository 210 comprises memory resources capable of storing the hosted content. In some cases content repository 210 comprises multiple repositories which are physically and/or logically separated, such that content provider 200 is capable of delivering content obtained from multiple storage resources. Tracking log 220 is configured to correlate content consumption and session progress with a particular user, such as an identified user of content consumption device 100, thereby allowing content consumption data to be compiled. In certain embodiments such content consumption data is used to populate a partial session progress matrix which can form the basis for subsequent session progress predictions, as will be disclosed in turn. Streaming services 230 include software and/or hardware capable of streaming, transcoding, or otherwise delivering content over network 500. Examples of commercially available content providers include YouTube (Google Inc., Mountain View, Calif.), Hulu (Hulu, Los Angeles, Calif.), Netflix (Netflix, Inc., Los Gatos, Calif.), and iTunes (Apple Inc., Cupertino, Calif.). It will be appreciated that the embodiments disclosed herein are configured to work with a wide variety of existing and subsequently developed content providers.

As disclosed herein, consumption analytics server 300 can be configured to analyze interactions between a plurality of content providers 200 and a plurality of content consumption devices 100, for example on the basis of information compiled in tracking log 220. In certain embodiments consumption analytics server 300 comprises a consumption analytics engine 390, which further comprises a consumption estimation module 392, a partial matrix construction module 394, a matrix completion module 396, and a user interface module 398. In such embodiments consumption estimation module 392 is configured to estimate session progress for observed content consumption sessions, for example based on data extracted from tracking log 220. Partial matrix construction module 394 can use these estimates to populate a session progress matrix in which each matrix element represents a session progress for a particular user consuming a particular content item. Matrix completion module 396 can use a collaborative filtering technique to complete the session progress matrix. Examples of suitable collaborative filtering techniques that can be used in this regard include analysis of variance (ANOVA) statistical models, singular value decomposition (SVD) techniques, nearest neighbor (kNN) methods, and restricted Boltzman machines (RBM). Additional examples of suitable collaborative filtering techniques are provided in Feuerverger, et al., *Statistical Significance of the Netflix Challenge*, Statistical Science, vol. 27, no. 2, pp. 202-231 (2012).

The values obtained as a result of the matrix completion operation represent session progress predictions with respect to unobserved content consumption sessions. Data extracted from the completed session progress matrix can be revealed using user interface module 398, either on an individual or aggregate basis. For example, in certain embodiments user interface module 398 can be configured to provide a query based interface configured to receive user queries and reveal results generated from such queries. Since the particular functionality provided in a given implementation may be specifically tailored to the demands of that implementation, consumption analytics engine 390 may comprise additional, fewer, or alternative sub-modules in other embodiments. Additional details regarding the functionality provided by the various modules comprising consumption analytics engine 390 will be provided in turn.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the digital content consumption analysis methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein are optionally incorporated into other software applications, such as marketing campaign management applications, or can optionally leverage services provided by other software applications, such as sentiment analysis applications. The computer software applications disclosed herein may include a variety of different modules, sub-modules, or other components of distinct functionality, and can provide information to, or receive information from, still other components and/or subcomponents. The modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. Thus in other embodiments networked computer system 1000 may comprise additional, fewer, or alternative components as compared to those included in the example embodiment illustrated in FIG. 1.

The non-transitory computer readable media disclosed herein may comprise any suitable media capable of storing content, such as a hard drive, a server, a flash memory, and/or random access memory. In alternative embodiments the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out certain of the functionalities disclosed herein. It will be apparent that any suitable combination of hardware, software, and firmware can be used, and that this disclosure is not intended to be limited to any particular system architecture.

Methodology

Figure 2:
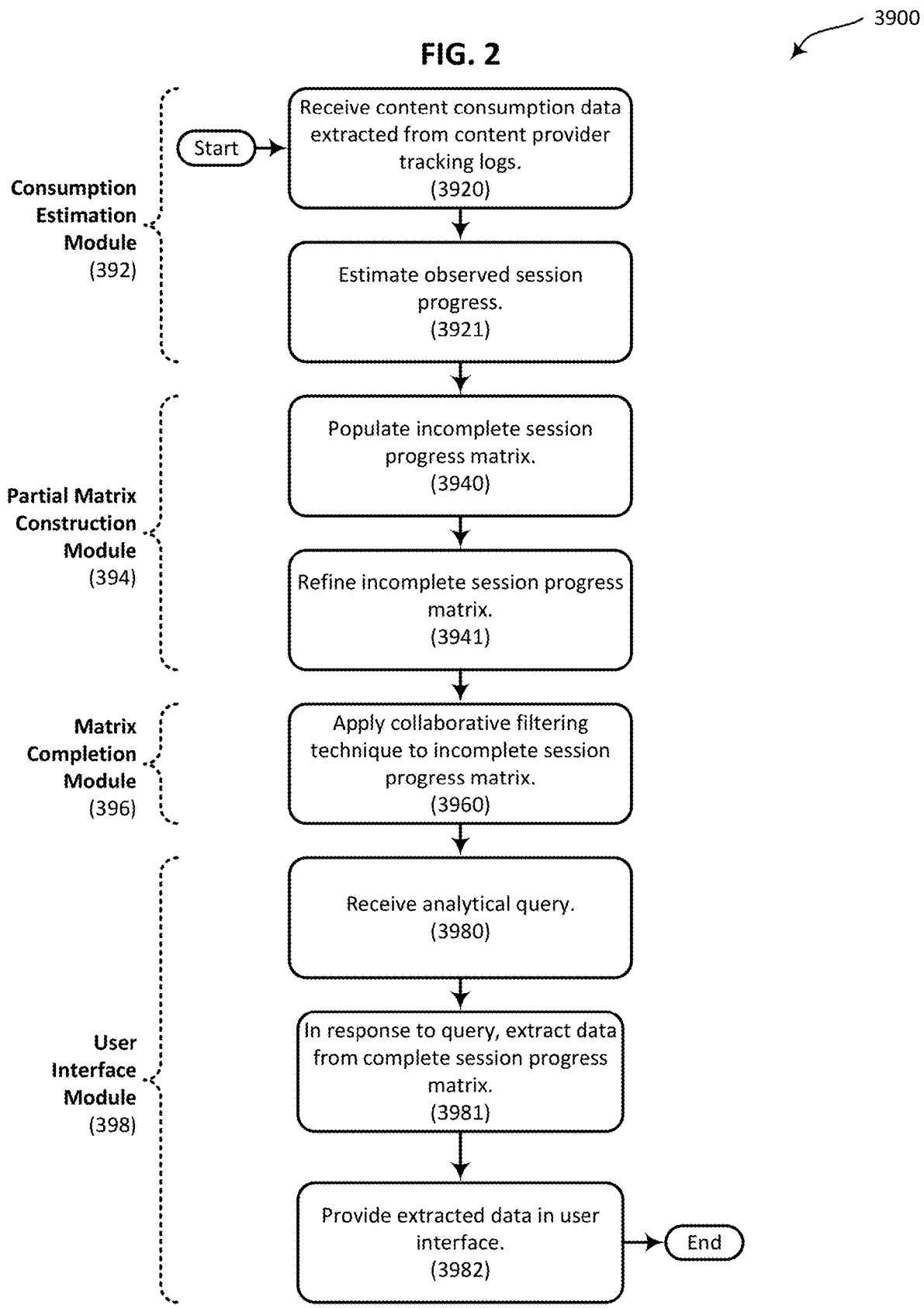
FIG. 2 is a flowchart illustrating a method that can be used to predict the duration of a digital content consumption session based on historical observations of how users have interacted with a repository of digital content.

FIG. 2 is a flowchart illustrating a digital content consumption analysis method 3900 that can be used to predict the duration of a digital content consumption session based on historical observations of how users have interacted with a repository of digital content. As can be seen, digital content consumption analysis method 3900 includes a number of phases and sub-processes, the sequence of which may vary from one embodiment to another. However, when considered in the aggregate, these phases and sub-processes form a complete digital content consumption analysis process that is responsive to user input in accordance with certain of the embodiments disclosed herein. These methodologies can be implemented, for example, using the system architecture illustrated in FIG. 1. However other system architectures can be used in other embodiments, as will be apparent in light of this disclosure. To this end, the correlation of the various functionalities shown in FIG. 2 to the specific components illustrated in FIG. 1 is not intended to imply any structural and/or use limitations. Rather other embodiments may include varying degrees of integration where multiple functionalities are performed by one system or by separate systems. For instance, in an alternative embodiment the functionality associated with consumption analytics engine 390 can be incorporated into content provider 200, such that session progress predictions can be made directly by content provider 200 itself. Thus other embodiments may have fewer or more modules and sub-modules depending on the granularity of implementation. Numerous variations and alternative configurations will be apparent in light of this disclosure.

Still referring to FIG. 2, the example digital content consumption method 3900 commences with consumption estimation module 392 receiving content consumption data that has been extracted from one or more tracking logs 220 maintained by a corresponding one or more content providers 200. See reference numeral 3920 in FIG. 2. Consumption estimation module can then use the received content consumption data to estimate a session progress sp for each of the observed content consumption sessions. See reference numeral 3921 in FIG. 2. Because tracking log 220 can be configured to correlate content consumption observations with a particular user, each of the resulting observed session progress estimates can be associated with a particular user. When a large quantity of content consumption data is received from a large quantity of tracking logs 220 maintained at a large quantity of content providers, the resulting session progress estimates provide a foundation upon which session progress predictions can be made. For example, in one embodiment a plurality of tracking logs 220 record over one billion events that comprise approximately 30 million content consumption sessions. Even larger quantities of events and data can be tracked and collected in other embodiments.

Session progress can be expressed as a ratio of the portion of a content item which is actually consumed to a total duration of the content item. Thus, if $t_e$ represents the time at which a user exits a content consumption session for a content item of total duration L, the session progress sp can be represented by the ratio $$sp = \frac{t_e}{L}. \qquad (1)$$

While the ratio provided by Equation (1) theoretically provides a precise measurement of session progress sp, as a practical matter it is difficult to determine the precise time $t_e$ at which a user exits a content consumption session. This is because content consumption sessions often end with events which are difficult to track, such as user navigation to other content, or user termination of a content browser 160 or media player 170 session. Such events can be difficult to track because of the segment-based nature of online content delivery. Digital content items are often broken into and transmitted as a series of segments. It is relatively straightforward to configure tracking log 220 to record events such as when a content consumer starts and/or completes a content segment. However, in some cases it can be difficult to configure tracking log 220 to record events that are not reflected at content provider 200, such as when a user navigates away from content or closes an application window in the middle of a segment.

In view of the fact that an exact value for $t_e$ may be unknown, in certain embodiments the session progress sp is estimated based on information that is readily extracted from tracking log 220, such as the time at which an interrupted segment started or was due to finish. That is, the session progress sp can be estimated empirically based on a segment ratio instead of a time ratio. Thus, if the last event content provider 200 recorded was the start or finish of the dth content segment of a content item that consists of D segments, the session progress sp can be estimated by $$sp \approx \frac{d}{D}. \qquad (2)$$

The session progress estimated by Equation (2) equals the actual session progress provided by Equation (1) where the dth segment is completed, but the (d+1)th segment is not started. However, if it is known only that the dth segment is started but not completed then $$sp \in \left[\frac{d-1}{D}, \frac{d}{D}\right]. \qquad (3)$$

A variety of different calculations can be used to estimate the observed session progress sp. For example, in one embodiment it is assumed that the interrupted session ended immediately after the dth segment started. In this case a "fully-completed" segment progress approximation $sp_{fc}$ is provided by $$sp_{fc} = \frac{d-1}{D}. \qquad (4)$$

In an alternative embodiment, it is assumed that the interrupted session ended in the middle of the dth segment. In this case an "averagely-completed" segment progress approximation $sp_{ac}$ is provided by $$sp_{ac} = \frac{d - 0.5}{D}. \tag{5}$$

While certain of the embodiments disclosed herein use either the fully-completed session progress approximation $sp_{fc}$ or the averagely-completed session progress approximation $sp_{ac}$, it will be appreciated that, in general, any suitable calculation can be used to make a segment-based approximation of the session progress sp. For example, in a modified embodiment the session progress predictions are based on aggregate segment duration instead of segment count, thus accounting for the fact that all segments are not necessarily of equal duration. In other embodiments, for example wherein non-segmented content is processed, session progress can be calculated directly based on the ratio of the exit time $t_e$ and the total duration of the content L. Thus it will be appreciated that the session progress estimation methods disclosed herein are considered optional and may be omitted in certain embodiments.

Figures 3, 4:
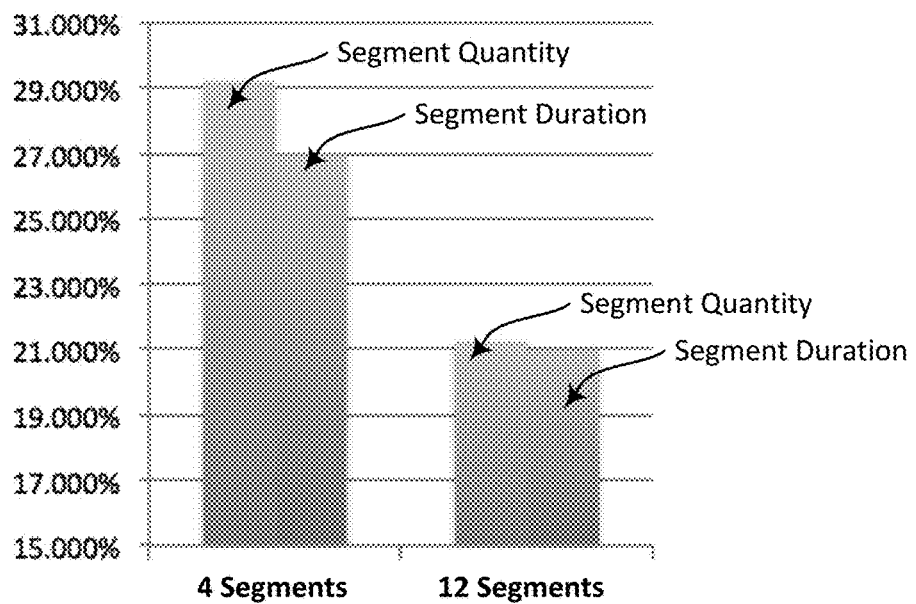
FIG. 3 illustrates an example of an incomplete M×N session progress matrix $A_{sp}$, wherein each entry $\alpha_{i,j}$ represents an estimate of the session progress for a content consumption session involving an ith user (of M total users) and a jth content item (of N total content items).
FIG. 4 is a bar chart illustrating root mean square error as a function of the number of segments upon which session progress predictions are based, wherein error rates for session progress estimates based on both session quantity and session duration are provided.

Referring again to FIG. 2, once the observed session progress is determined, partial matrix construction module 394 can be configured to populate an incomplete session progress matrix. See reference numeral 3940 in FIG. 2. The resulting session progress matrix captures the observed content consumption sessions of M users, each of whom consumes at least one of N content items. In particular, each matrix entry $\alpha_{i,j}$ represents an estimate of the session progress sp for a content consumption session involving an ith user and a jth content item. FIG. 3 illustrates an example of an incomplete session progress matrix 10. For example, FIG. 3 illustrates that User 1 was observed to have consumed approximately 13% of Content Item 1, was not observed to have interacted with Content Item 2, and was observed to have consumed approximately 0% of Content Item 3. Thus the correlations between a particular user and a particular content item, which are recorded in tracking log 220, are also represented in session progress matrix $A_{sp}$. A session progress matrix that is populated using session progress estimates based on the "fully-completed" segment progress approximation can be designated as $A_{spfc}$. A session progress matrix that is populated using session progress estimates based on the "averagely-completed" segment progress approximation can be designated as $A_{spac}$.

Partial matrix construction module 394 is optionally configured to refine incomplete session progress matrix 10 before further processing. See reference numeral 3941 in FIG. 2. For example, where duplicate content consumption sessions exist, such as may occur when the same user consumes the same content item multiple times, redundant session progress estimates will exist. In one embodiment, refining incomplete session progress matrix 10 comprises retaining only the most recent session progress estimate when redundant estimates exist. However in alternative embodiments a different retention criterion can be used, such as retention of the first, most complete, or least complete session progress estimate. In another embodiment, refining incomplete session progress matrix 10 comprises eliminating session progress estimates based on content items that comprise fewer than a threshold quantity of segments. In one embodiment such a threshold is established at four segments, although other threshold segment quantities can be applied in other embodiments, such as two segments, six segments, eight segments, ten segments, twelve segments, fourteen segments, sixteen segments, or twenty segments. In general the larger number of segments, the more accurate a corresponding session progress estimate will be. Thus eliminating session progress estimates based on content items that comprise a small number of segments both simplifies subsequent computations, but also serves to increase the accuracy of the resulting session progress predictions.

Still referring to the example embodiment illustrated in FIG. 2, matrix completion module 396 applies a collaborative filtering technique to incomplete session progress matrix 10. See reference numeral 3960 in FIG. 2. In general, an incomplete M×N session progress matrix $A_{sp}$ will be highly ($\gtrsim$95%) sparse, even when the foregoing optional refinements are applied. One example of an iterative algorithm for completing the incomplete session progress matrix is "SOFT-IMPUTE", as disclosed in Mazumder, et al., "Spectral Regularization Algorithms for Learning Large Incomplete Matrices", Journal of Machine Learning Research, vol. 11, pp. 2287-2322 (August 2010). Thus in certain embodiments SOFT-IMPUTE is used as a collaborative filtering technique to complete an incomplete session progress matrix. In other embodiments other collaborative filtering matrix completion techniques can be used to complete the incomplete session progress matrix. For example, another similar class of techniques known as maximum margin factorization methods use a factor model for the target matrix. Additional details regarding maximum margin factorization methods are disclosed in Srebro, et al., "Maximum-Margin Matrix Factorization", Advances in Neural Information Processing Systems (NIPS) 17 (December 2004). In general, SVD techniques allow hidden correlations to be extracted from a partially complete session progress matrix. Yet another example of a collaborative filtering technique is a noisy low-rank matrix completion algorithm.

Once the session progress matrix has been completed, consumption analytics engine 390 is ready to generate session progress predictions based on user queries. For example, in one embodiment user interface module 398 is configured to receive an analytical query. See reference numeral 3980 in FIG. 2. In certain embodiments the analytical query is generated manually, such as via a user interface that allows an analyst to select a particular content item and a particular user. In other embodiments the analytical query is generated automatically, such as by a targeted content management or recommendation system configured to identify content items that match the interests of a particular user or target audience. Another example of automatic query generation occurs where a recently-initiated content consumption session is observed and a content provider or other entity is to predict the duration of such session. Regardless of how the query is generated, user interface module 398 can be configured to respond to such query by extracting data from the completed session progress matrix. See reference numeral 3981 in FIG. 2. The extracted data can be presented in a user interface. See reference numeral 3982 in FIG. 2.

In an alternative embodiment the session progress predictions are based on segment duration instead of segment count. Scaling the session progress predictions based on session duration can be particularly advantageous where it is desired to retain data associated with content items consisting of relatively small segment quantities. For example, FIG. 4 is a bar chart illustrating RMSE as a function of the number of segments upon which session progress predictions are made. Session progress estimates based on both session quantity and session duration are provided. As can be seen, basing session progress estimates on session duration provides significantly lower RMSE rates in the content of content items consisting of smaller segment quantities. In the data illustrated in FIG. 4, the RMSE is based on a content consumption session length that has been normalized to 100.000.

Conclusion

As disclosed herein, session progress predictions based on historical observations of how users have interacted with a repository of digital content offer significant advantages over existing rating-based content evaluation systems. In particular, the various embodiments disclosed herein enable session progress predictions to be made without requiring any direct user interaction with the content, other than interactions used to actually play the content itself. This facilitates automated session progress predictions which can be used to, among other things, make content recommendations for users, evaluate market segments which are attracted to particular content items, insert advertisements at appropriate locations within a content item, and more efficiently allocate network resources. In particular, in certain applications consumption analytics engine 390 can be incorporated into a targeted content management system configured to identify content items that would be appropriate for a particular user or target audience. For example, in one such embodiment consumption analytics engine 390 is configured to generate a plurality of session progress predictions for a given user or target audience, and, based on the largest session progress predictions, to identify one or more content items believed to be well-suited for the given user or target audience. The various embodiments disclosed herein allow more personalized session progress predictions to be made as compared to mean-based predictions which indicate only a generalized popularity across a large group of content consumers.

Numerous variations and configurations will be apparent in light of this disclosure. For instance, one example embodiment provides a method for predicting content consumption session progress. The method comprises receiving content consumption data from a content provider. The content consumption data characterizes a plurality of interactions between a first group of content consumers and a first repository of content items. The method further comprises estimating a plurality of session progress values based on the content consumption data. Each of the session progress values is associated with an interaction between one of the content consumers and one of the content items. The method further comprises populating an incomplete session progress matrix with the plurality of session progress values. The method further comprises completing the incomplete session progress matrix using a collaborative filtering matrix completion technique that results in a completed session progress matrix. The method further comprises generating a content consumption session progress prediction based on at least one value extracted from the completed session progress matrix. In some cases the method further comprises receiving a query from a user interface and generating the content consumption session progress prediction based on the received query, wherein the query is based on user input provided at the user interface. In some cases the method further comprises receiving a query from a targeted content recommendation engine and generating the content consumption session progress prediction based on the received query, wherein the query is generated by the targeted content manager based on a request for targeted content. In some cases the method further comprises refining the incomplete session progress matrix before using the collaborative filtering matrix completion technique, wherein refining further comprises removing estimated session progress values associated with content items that comprise fewer than a threshold quantity of segments. In some cases estimating the plurality of session progress values comprises, for each of the interactions, comparing a quantity of segments transmitted to a content consumer with a total quantity of segments associated with a content item. In some cases the content provider hosts the first repository of content items and provides streaming services that enable content items stored in the first repository to be delivered to a plurality of content consumers. In some cases the incomplete session progress matrix has a sparsity greater than about 95%. In some cases the content consumption data comprises data indicating, for each of the interactions, which of a plurality of content item segments are transmitted to a content consumer, wherein the plurality of content item segments comprise a content item. In some cases the content consumption data is extracted from a tracking log hosted by the content provider. In some cases the content consumption data is received from a plurality of content providers.

Another example embodiment provides a system for estimating user engagement with a content item. The system comprises a consumption estimation module configured to receive content consumption data extracted from a tracking log and to estimate a plurality of content consumption session progress values based on the extracted content consumption data. The system further comprises a matrix completion module configured to generate a completed session progress matrix based on the content consumption session progress values estimated by the consumption estimation module. The system further comprises a user interface module configured to respond to a received analytical query based on information contained within the completed session progress matrix. In some cases (a) the tracking log is hosted by a content provider that also hosts a content repository; and (b) the estimated content consumption session progress values characterize a plurality of interactions between a plurality of content consumers and a plurality of content items stored in the content repository. In some cases the matrix completion module generates the completed session progress matrix using a collaborative filtering matrix completion technique. In some cases the system further comprises a partial matrix construction module configured to populate an incomplete session progress matrix that correlates the session progress values with a plurality of content consumers, wherein the incomplete session progress matrix has a sparsity greater than approximately 95%. In some cases the system further comprises a partial matrix construction module configured to (a) populate an incomplete session progress matrix that correlates the session progress values for a plurality of content consumers, each of which has interacted with at least one of a plurality of content items; and (b) remove from the incomplete session progress matrix session progress values associated with content consumers who have interacted with fewer than a threshold quantity of content items. In some cases the system further comprises a partial matrix construction module configured to (a) populate an incomplete session progress matrix that correlates the session progress values for a plurality of content consumers, each of which has interacted with at least one of a plurality of content items; and (b) remove from the incomplete session progress matrix session progress values associated with content items which have been involved in fewer than a threshold quantity of content consumer interactions.

Another example embodiment provides a non-transitory computer readable medium having instructions encoded thereon that, when executed by one or more processors, causes a content consumption session progress prediction process to be carried out. The process comprises receiving content consumption data from a content provider. The content consumption data characterizes a plurality of interactions between a first group of content consumers and a first repository of content items. The process further comprises estimating a plurality of session progress values based on the content consumption data. Each of the session progress values is associated with an interaction between one of the content consumers and one of the content items. The process further comprises populating an incomplete session progress matrix with the plurality of session progress values. The process further comprises completing the incomplete session progress matrix using a collaborative filtering matrix completion technique that results in a completed session progress matrix. The process further comprises generating a content consumption session progress prediction based on at least one value extracted from the completed session progress matrix. In some cases the first repository of content items comprises multimedia content items having a playback duration. In some cases a session progress value sp associated with an interaction between a particular content consumer and a particular content item is based on a ratio of $(d-1)$ to D, wherein d equals a quantity of content item segments initiated at a content consumption device, and D equals a total quantity of content item segments comprising the particular content item. In some cases a session progress value sp associated with an interaction between a particular content consumer and a particular content item is based on a ratio of $(d-0.5)$ to D, wherein d equals a quantity of content item segments initiated at a content consumption device, and D equals a total quantity of content item segments comprising the particular content item.

The foregoing detailed description has been presented for purposes of illustration and description. It is not intended to be exhaustive or to limit the invention to the precise form described. Many modifications and variations are possible in light of this disclosure. It is intended that the scope of the invention be limited not by this detailed description, but rather by the claims appended hereto.

What is claimed is:

1. A method for predicting content consumption session progress, the method comprising:
   receiving content consumption data from a content provider, wherein the content consumption data characterizes a plurality of interactions between a first group of content consumers and a first repository of content items;
   calculating a plurality of session progress values based on the content consumption data, wherein each of the calculated session progress values is associated with one of the interactions between one of the content consumers and one of the content items;
   populating an incomplete session progress matrix with the plurality of calculated session progress values;
   refining the incomplete session progress matrix by removing calculated session progress values associated with (a) content items that comprise fewer than a threshold quantity of segments, and (b) content consumers who have interacted with fewer than a threshold quantity of unique content items;
   after refining the incomplete session progress matrix, completing the incomplete session progress matrix using a collaborative filtering matrix completion technique that results in a completed session progress matrix that includes a plurality of estimated session progress values;
   receiving a query that identifies a particular content item and a particular content consumer;
   in response to receiving the query, generating a content consumption session progress prediction for the particular content item and the particular content consumer identified in the query using a corresponding particular estimated session progress value extracted from the completed session progress matrix; and
   generating a recommendation to insert targeted content into the particular content item at a time point that depends on the content consumption session progress prediction.

2. The method of claim 1, wherein the query is based on user input provided at a user interface.

3. The method of claim 1, wherein the query is received from a targeted content recommendation engine in response to a request to insert the targeted content into the particular content item.

4. The method of claim 1, wherein calculating the plurality of session progress values comprises, for at least a portion of the interactions, comparing a quantity of segments transmitted to one of the content consumers with a total quantity of segments associated with one of the content items.

5. The method of claim 1, wherein the content provider hosts the first repository of content items and provides streaming services that enable content items stored in the first repository to be delivered to one or more of the content consumers.

6. The method of claim 1, wherein the incomplete session progress matrix has a sparsity greater than about 95%.

7. The method of claim 1, wherein
   the content consumption data comprises data indicating, for each of the interactions, which of a plurality of content item segments are transmitted to one of the content consumers; and
   the plurality of content item segments form one of the content items.

8. The method of claim 1, wherein the content consumption data is extracted from a tracking log hosted by the content provider.

9. The method of claim 1, wherein the content consumption data is received from a plurality of content providers.

10. A system for estimating user engagement with a content item, the system comprising:
   a memory;
   a processor operatively coupled to, and configured to execute instructions stored in, the memory;
   a consumption estimation module comprising instructions, stored in the memory, that when executed using the processor are configured to receive content consumption data extracted from a tracking log, determine a plurality of content consumption session progress values based on the received content consumption data, and store the content consumption session progress values in an incomplete session progress matrix, wherein a specific session progress value associated with an interaction between a specific content consumer and a specific content item is based on a ratio of $(d-1)$ to D, wherein d equals a quantity of content item segments of the specific content item that were initiated at a content consumption device, and D equals a total quantity of content item segments comprising the specific content item;
   a partial matrix construction module comprising instructions, stored in the memory, that when executed using the processor are configured to refine the incomplete session progress matrix by removing content consumption session progress values associated with (a) a content item that comprises fewer than a threshold quantity of segments, and (b) a content consumer who has interacted with fewer than a threshold quantity of unique content items;

a matrix completion module comprising instructions, stored in the memory, that when executed using the processor are configured to generate a completed session progress matrix based on (a) the content consumption session progress values determined by the consumption estimation module and (b) the incomplete session progress matrix as refined by the partial matrix construction module; and a user interface module comprising instructions, stored in the memory, that when executed using the processor are configured to respond to a received analytical query that identifies a particular content item and a particular content consumer, wherein responding to the received analytical query includes (a) extracting, from the completed session progress matrix, a particular content consumption session progress value that is associated with the particular content item and the particular content consumer, and (b) generating a recommendation to insert targeted content into the particular content item at a time point that depends on the particular content consumption session progress value.

11. The system of claim 10, wherein:
the tracking log is hosted by a content provider that also hosts a content repository; and
the content consumption session progress values determined by the consumption estimation module characterize a plurality of interactions between a plurality of content consumers and a plurality of content items stored in the content repository.

12. The system of claim 10, wherein the matrix completion module generates the completed session progress matrix using a collaborative filtering matrix completion technique.

13. The system of claim 10, wherein the incomplete session progress matrix, as refined by the partial matrix construction module, has a sparsity greater than 95%.

14. The system of claim 10, wherein refining the incomplete session progress matrix further includes removing, from the incomplete session progress matrix, and before the matrix completion module generates the completed session progress matrix, calculated session progress values associated with content items which have been involved in fewer than a threshold quantity of content consumer interactions.

15. A non-transitory computer readable medium having instructions encoded thereon that, when executed by one or more processors, causes a content consumption session progress prediction process to be carried out, the process comprising:
receiving content consumption data from a content provider, wherein the content consumption data characterizes a plurality of interactions between a first group of content consumers and a first repository of content items;
calculating a plurality of session progress values based on the content consumption data, wherein each of the calculated session progress values is associated with one of the interactions between one of the content consumers and one of the content items;
populating an incomplete session progress matrix with the plurality of calculated session progress values;
refining the incomplete session progress matrix by removing calculated session progress values associated with (a) content items that comprise fewer than a threshold quantity of segments, and (b) content consumers who have interacted with fewer than a threshold quantity of unique content items;
after refining the incomplete session progress matrix, completing the incomplete session progress matrix using a collaborative filtering matrix completion technique that results in a completed session progress matrix that includes a plurality of estimated session progress values;
receiving a query that identifies a particular content item and a particular content consumer;
in response to receiving the query, generating a content consumption session progress prediction for the particular content item and the particular content consumer identified in the query using a corresponding particular estimated session progress value extracted from the completed session progress matrix; and
generating a recommendation to insert targeted content into the particular content item at a time point that depends on the content consumption session progress prediction.

16. The non-transitory computer readable medium of claim 15, wherein the first repository of content items comprises multimedia content items having a playback duration.

17. The non-transitory computer readable medium of claim 15, wherein a specific session progress value associated with an interaction between a specific content consumer and a specific content item is calculated based on a ratio of $(d-1)$ to D, wherein d equals a quantity of content item segments of the specific content item that were initiated at a content consumption device, and D equals a total quantity of content item segments comprising the specific content item.

18. The non-transitory computer readable medium of claim 15, wherein a specific session progress value associated with an interaction between a specific content consumer and a specific content item is calculated based on a ratio of $(d-0.5)$ to D, wherein d equals a quantity of content item segments of the specific content item that were initiated at a content consumption device, and D equals a total quantity of content item segments comprising the specific content item.

* * * * *